Dec. 31, 1968 W. H. MacWILLIAMS, JR., ET AL 3,419,826

MICROWAVE SLIP RING

Filed Dec. 16, 1966 Sheet 1 of 4

INVENTORS W. H. MAC WILLIAMS, JR.
D. H. RING
BY John P. McDonnell
ATTORNEY

MICROWAVE SLIP RING

United States Patent Office 3,419,826

Patented Dec. 31, 1968

3,419,826

MICROWAVE SLIP RING

Walter H. MacWilliams, Jr., Bernardsville, and Douglas H. Ring, Red Bank, N.J., assignors to Bell Telephone Laboratories, Incorporated, Berkeley Heights, N.J., a corporation of New York Filed Dec. 16, 1966, Ser. No. 602,292

8 Claims. (Cl. 333—98)

This invention concerns the field of electromagnetic signal communication between two terminals in relative motion, specifically where the signals are of the frequencies and bandwidths that can be transmitted through waveguides.

There are many known methods of electrically transmitting information to and from moving bodies; these methods are severely taxed, however, by a recent California development. As shown in "Popular Science," November 1965, at page 118, the construction of large slowly rotating apartment houses is proposed, raising the problem of providing subscriber telephone service to the tenants. If the buildings are to rotate continually in one direction, continuous flexible or twistable cables are, of course, excluded.

Since it is desirable in new installations to provide for Picturephone visual telephone service, the necessary bandwidth could not be obtained with ordinary slip rings, and in large apartment houses of more than 100 dwelling units, plugging and unplugging all of the wire pairs every revolution is not feasible. As a practical matter, therefore, it is desirable to have a single broad band system, operating at microwave frequencies, which is capable of transmitting simultaneously all of the Picturphone visual telephone service conversations as well as possible alarm signals. The manner of multiplexing hundreds of phone conversations or several video or data signals into a single microwave signal frequency band is well known in the art and need not be explained here. The signals handled by this invention will already be in the broad band microwave form.

A radiative microwave radio link between an antenna on the roof of the rotating building and one on a nearby tower could certainly do the job. If there were several such apartment houses in a relatively small area, however, there might be considerable interference between the radio links. In addition, since anyone with the proper equipment can intercept broadcasts, the degree of privacy would be weakened which would be disadvantageous for telephone service. Finally, frequency allocation in a busy area could be a problem. The direct transmission of such microwave signals by waveguide techniques is much more desirable.

There are several waveguide rotating joints in the prior art that perform quite satisfactorily. In most of these, however, the axis of rotation intersects the waveguides or lies within a few inches of them and is accessible. In a large apartment house rotating about a stout supporting core, the axis of rotation may be many feet from the area available for a rotating joint.

In the arrangement disclosed in United States Patent 2,737,633, issued to K. Tomiyasu, Mar. 6, 1956, access to the axis is not required, but a sliding fit is provided between two annular waveguides over their whole length. With the size sections contemplated here, the necessary fit tolerance would be difficult and expensive to achieve. The arrangement shown in United States Patent 3,189,855 issued to M. P. Forrer, June 15, 1965, compounds the problem by adding an intermediate resonant waveguide ring; two such sliding fits are required.

A microwave coupling which allows considerable movement between the coupled terminals can also be very useful in non-rotating applications. There is need for a broad band communications link to transmit wideband control and television monitoring signals to and from elevators, traveling cranes, test and maintenance equipment and conveyor belts, particularly when the equipment must travel through radiation hot areas.

An object of this invention is therefore to provide a new, simple and improved movable waveguide joint.

A second object is to provide a broad band communications link btween a fixed terminal and a vehicle capable of moving along a predetermined path.

Another object is to couple electromagnetic signals between terminals in relative rotation with limited or no access to the rotation axis.

A further object is to connect telephones on a rotating apartment building to a central office.

A still further object is to connect television and Picturephone visual telephone signals to rotating buildings.

The invention utilizes a waveguide of rectangular cross section extending adjacent to the path of the movable body. Microwave signals are coupled between the fixed terminal and the waveguide in any usual manner for setting up the dominant mode of propagation, such as a probe fed through a hole in and fastened to the waveguide. Coupling between the waveguide and the movable terminal may be accomplished by another probe fed through a continuous slot in one face of the waveguide from the center conductor of a coaxial line. The outer conductor of the coaxial line is connected to the outer surface of the waveguide by means of a microwave choke, capacitive coupling, or brush contact. Proper RF termination at the ends of the waveguide reduces standing waves which would otherwise be caused by reflections.

In an embodiment for rotating structures, the invention utilizes an annular waveguide of rectangular cross section whose axis is the axis of rotation of the structure. The waveguide may be fastened to either the rotating or the fixed part of the structure. An attenuating strip within the waveguide reduces the standing waves which would otherwise be caused by overlapping transmission from opposite directions. In one arrangement, an auxiliary waveguide sector is switched into the circuit when the probes are close enough to cause transmission anomalies. Another arrangement uses only one waveguide, but with multiple probes and switches.

The reader may get a fuller understanding of the invention from the following description in conjunction with the drawings.

In the drawings:

FIG. 1 is a detailed drawing of the invention in its simplest form;

FIGS. 2A, B, C and D are cross sectional views of the waveguide and probes;

Figures 6A, 6B, 6C:
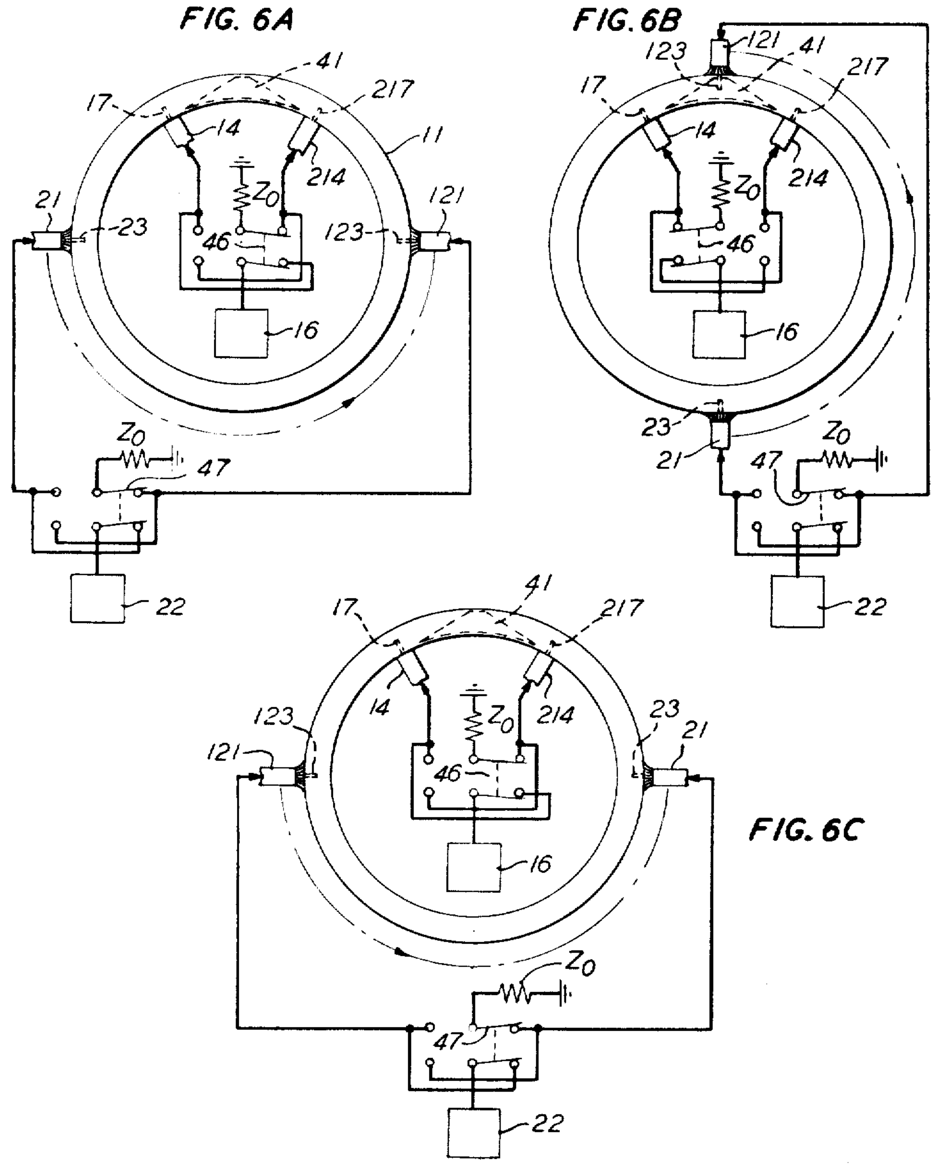
Figure 5A:
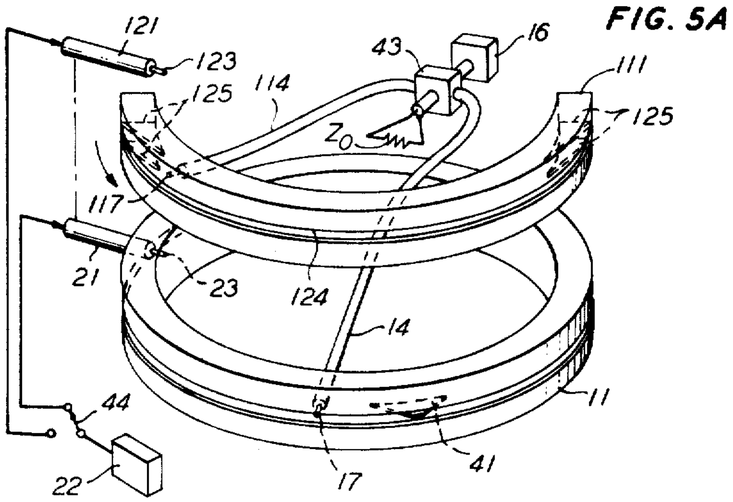

FIGS. 5A, B and C represent one embodiment illustrating the switching required, and FIGS. 6A, B and C represent another embodiment illustrating its switching arrangement.

Figure 1:
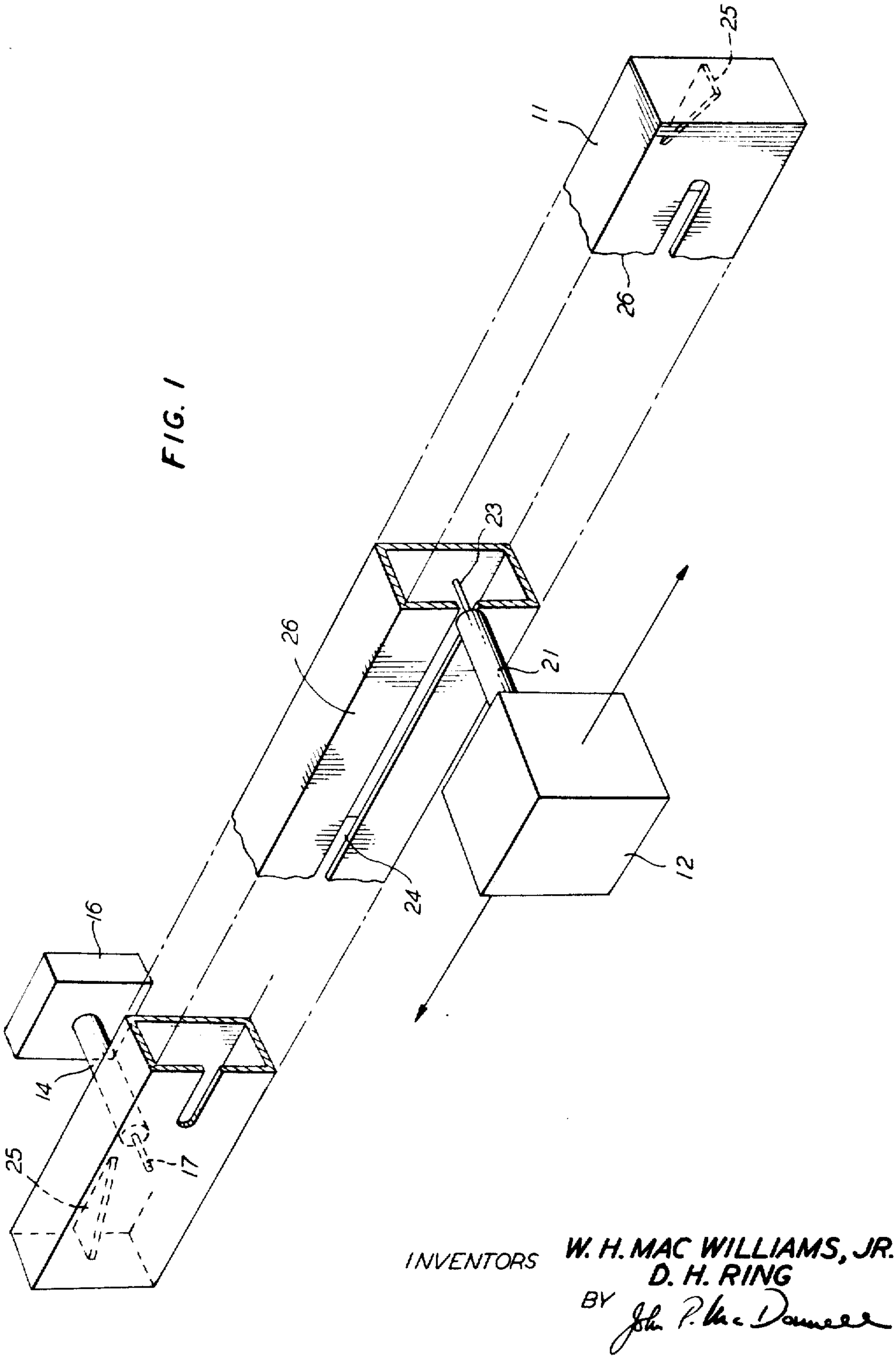

According to the invention as shown in FIG. 1, a waveguide 11 of rectangular cross-section is mounted parallel to the path of a movable terminal 12. A coaxial line 14 connects a fixed terminal 16 with a probe 17 which projects into the waveguide. While a simple probe which is merely an extension of the central conductor of coaxial line 14 is shown, the invention is not restricted thereto as any of the known means of coupling $TE_{10}$ signals into rectangular waveguides will do. A second coaxial line 21 connects movable terminal 12 with a probe 23 which enters the waveguide through a continuous slot 24 in one wide face 26 of the waveguide. A wide face is chosen for the slot because the electric field is zero at its center. Where the waveguide is long and attached to a rigid structure, a mechanical guide, such as is well known in the art, must be provided to maintain the alignment and depth of probe 23 in slot 24. The outer conductor of coaxial line 21 is connected to the outer surface of the waveguide by brush contact. Alternative methods of making this connection are described later. Microwave signals are thereby coupled between the fixed terminal 16 and the waveguide by probe 17 and between the movable terminal 12 and the waveguide by probe 23. For the purpose of this invention probe 17 and probe 23 may or may not be identical; to minimize confusion, however, they will be consistently referred to here as fixed probe 17 and movable probe 23, respectively. RF terminations 25—25 such as, for example the vane type attenuators shown on page 371 of "Principles and Applications of Waveguide Transmission," by G. C. Southworth, published by Van Nostrand Co., Inc. in 1950 may be used to eliminate reflections from the ends of the waveguide. With this arrangement, a broad band communications link may be maintained to any vehicle which moves along a definite track, curved or straight, and with continous, sporadic, or reciprocating motion.

Figures 2A, 2B, 2C, 2D, 3:
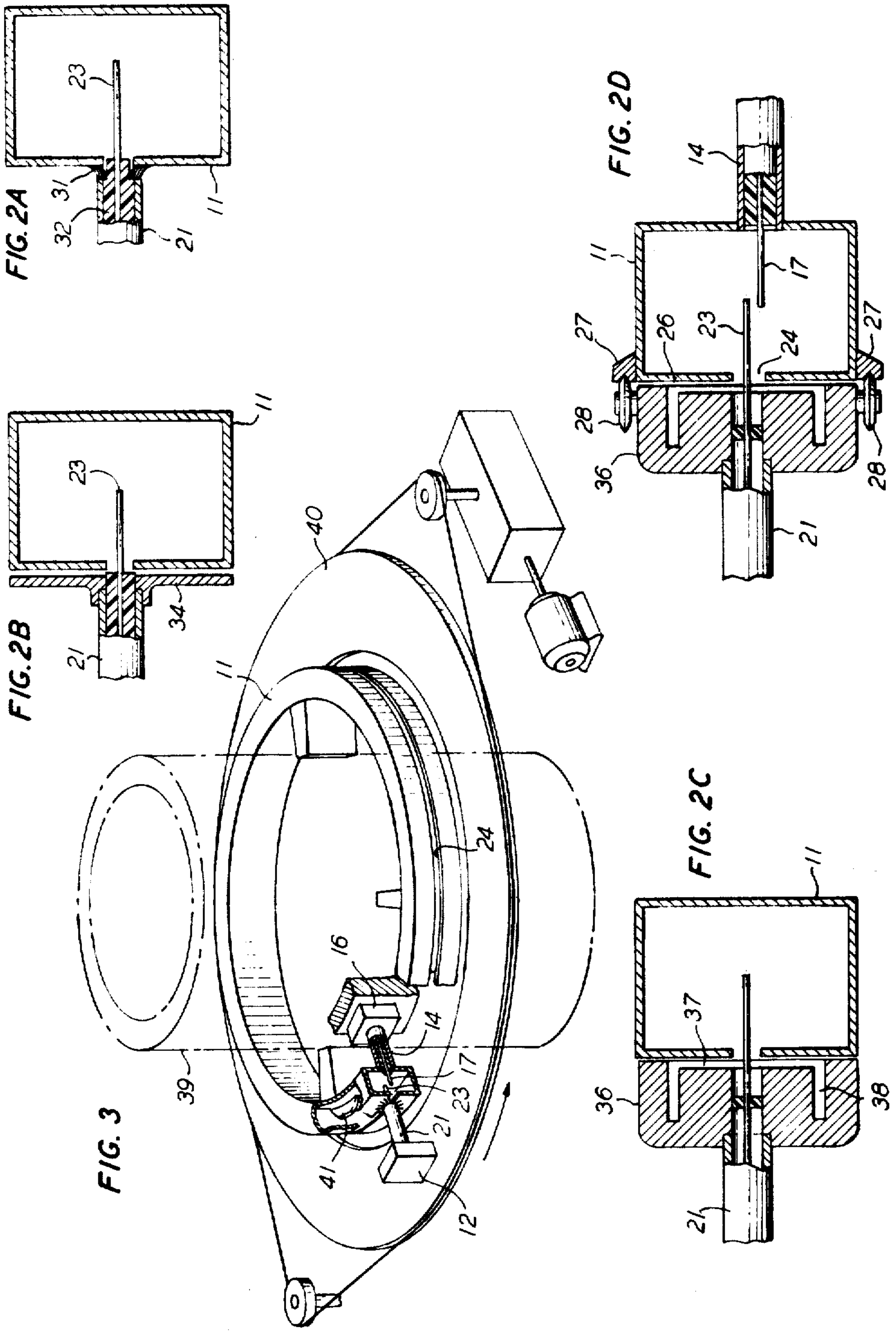
FIG. 3 is a pictorial representation of an embodiment for rotating buildings.

The electrical aspects of several practical couplings between the coaxial lines and the waveguides are illustrated in the detailed cross section drawings of FIGS. 2A, B, C and D. For one simple connector shown in FIG. 2A direct connection may be made between the outer conductor of the movable coaxial line 21 and the outer surface of the waveguide by flexible metal strands 31 as a brush; the strands are spread so as not to enter the waveguide slot. The noise developed by the sliding contact is reduced by the use of a large number of strands. The core insulation 32 of coaxial line 21 may enter the slot 24 a short distance to help maintain the alignment of probe 23 in the slot. Probe 23 may be merely an extension of the center conductor of coaxial line 21.

Since the presence of probe 23 in the waveguide disturbs the field and causes some radiation through the slot, it is preferable from the standpoint of telephone privacy for the movable probe structure to shield the slot over some length. An alternative connector is shown in FIG. 2B. In this case a flange 34 is fastened and electrically connected to the outer conductor of coaxial line 21. The flange is parallel to and closely spaced from the waveguide slotted surface. The capacitance between the waveguide and the flange is sufficient coupling at waveguide frequencies, and produces no noise.

A very practical coupling is shown in FIG. 2C. A microwave choke 36 such as is shown on page 201 of Southworth, id. is used to couple the outer conductor of the coaxial line 21 to the waveguide. The choke may be circular or oval in shape and has a transverse cavity 37 extending from the center and a longitudinal cylindrical cavity 38 extending from the transverse cavity, each of which is approximately one-quarter wavelength long. That is, the diameter of the transverse cavity is approximately one-half wavelength and the depth of the cylindrical cavity is approximately one-quarter wavelength at the midband frequency of the system. With this device, electrical coupling is made between the outer coax conductor and the waveguide without physical contact, and the slot is shielded over some length.

In some applications it will be necessary for the movable probe to pass by the fixed probe. FIG. 2D is a cross sectional view of the waveguide when probe 23 is just passing fixed probe 17. In order to provide the necessary clearance, fixed probe 17 is mounted slightly off center in the waveguide; this allows slot 24 to be centered for maximum efficiency. In addition, one other arrangement is shown for keeping probe 23 aligned in slot 24. Grooved tracks 27—27 are attached to the waveguide along the outer edges of slotted face 26 and coaxial line 21 is flexible. Rollers 28—28, attached to choke 36, roll in the grooves as the movable terminal 12 moves along the waveguide, thereby maintaining not only the alignment of the probe in the slot, but the clearance between choke 36 and waveguide 11 as well.

In the embodiment shown symbolically in FIG. 3, waveguide 11 is formed into an annular shape, encircles and is fastened to the stationary core 39 of a rotatable structure 40. It is preferable for minimum radiation that the curved vertical faces of the waveguide be the wider faces. The structure, illustrated as a simple platform, may be any rotatable structure, for example, an apartment house, a radar antenna, a satellite tracking station, or even an airport control tower. Coaxial line 14 connects fixed terminal 16 with fixed probe 17, which projects into the waveguide. For the purposes of this invention, it is immaterial whether the waveguide is fixed to the stationary or the movable part of the structure. The terminal which feeds signals through the waveguide slot may rotate with the building or may be fixed to the core or fixed beyond the periphery of the building. In order to prevent confusion, however, the terminal which is fixed with respect to the waveguide is here consistently called the fixed terminal 16 and is shown fixed to the center core of the structure. Standing waves set up by transmission from opposite directions in the waveguide are eliminated by the use of a resistive attenuator 41. There are many suitable devices well known to the art; in Southworth, id. at pages 366 to 371, several are illustrated and discussed.

Figure 4:
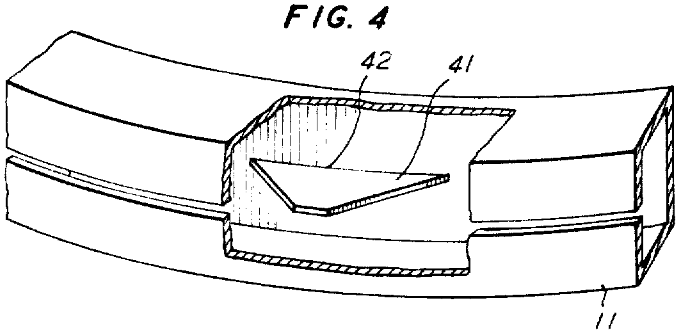
FIG. 4 illustrates an attenuator within the annular waveguide of FIG. 3.

One satisfactory attenuator of the resistive vane type is illustrated in FIG. 4. Attenuator 41 is a plane trapezoid in shape, tapered on both ends to reduce reflections and is mounted perpendicular to the slotted face of wave guide 11. Base 42 of the trapezoid is fastened to the waveguide parallel to its narrow faces and slightly off center in the plane of fixed probe 17 to provide clearance for movable probe 23. Wedge type attenuators, with a slot for probe clearance will also work well.

The foregoing system will provide two way communication between relatively rotating terminals by using a higher and a lower frequency band within the pass-band of the waveguide. Some improvement is desirable, however, during the period when the movable probe 23 is close to the fixed probe 17 and the attenuator 41.

One embodiment effecting this improvement is illustrated symbolically in FIGS. 5A, B and C. In this embodiment, waveguide 11, fixed probe 17, movable probe 23, and attenuator 41 operate as previously described. Attenuator 41 is spaced relatively close to fixed probe 17. An additional sector 111 of waveguide similar to waveguide 11 with closed ends is mounted parallel to waveguide 11. Afixed probe 117 projects into the sector near one end. A coaxial line 114 connects probe 117 to fixed terminal 16 through a hybrid junction 43. Prove 17 is also connected to the hybrid junction via coaxial line 14, and of course, the fourth connection of the hybrid junction is properly terminated in a matched load $Z_0$. Fixed terminal 16 is consequently continuously coupled to both waveguide 11 and waveguide sector 111. A slot 124 traverses one face and both ends of sector 111 to provide access for a movable probe 123 to enter and exit the sector. A pair of vane attenuators 125–125 is mounted within the sector 111 at each end to provide symmetrical RF terminations. Movable probe 123 rotates in synchronism with probe 23 and sector 111 is positioned so that when probe 23 is close to fixed probe 17 and attenuator 41, probe 123 is approximately in the middle of sector 111. A very fast microwave diode switch 44 connects movable terminal 22 alternatively to coaxial line 21 or coaxial line 121 which is connected to movable probe 123. Movable terminal 22 is therefore coupled to either waveguide 11 or sector 111, depending upon the position of switch 44.

Figure 5B:
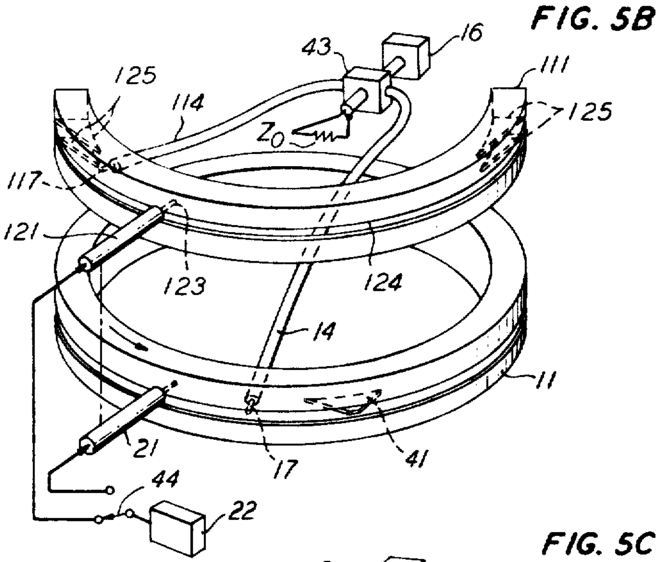
Figure 5C:
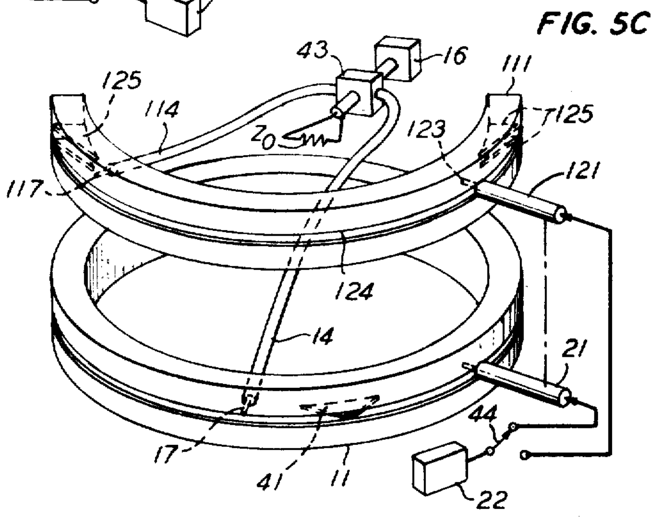

The three views of FIGS. 5A, B and C illustrate the relative positions of probes and waveguides at three different times and the switching required. Although the arrangement works for any direction of rotation and for any fixed position, a counter-clockwise rotation of movable terminal 22 and probes 23 and 123 is assumed for purposes of description. When probe 123 is beyond the end of sector 111, as in FIG. 5A, probe 23 is connected to movable terminal 22, and waveguide 11 is the transmission medium. When probe 123 has entered sector 111 and passed a few wavelengths beyond the attenuators 125–125 and fixed probe 117 and probe 23 is still a few wavelengths before fixed probe 17 or attenuator 41, as in FIG. 5B, switch 44 operates to disconnect probe 23 and connect probe 123 to the movable terminal 22 via coaxial line 121. Sector 111 then becomes the transmission medium until probe 23 has passed safely beyond attenuator 41 and probe 123 is still a few wavelengths before attenuators 125, as in FIG. 5C. At this point switch 44 again operates to reconnect probe 23 via coaxial line 21 for the remainder of the cycle.

It is advantageous for this application that switch 44 be both broad band to pass the entire multiplexed signal and fast acting to prevent circuit interruption. There are several adequate semiconductor switches available, such as Microwave Development Laboratories, Inc. Model #DS-3-1-1-60 for the 2,000 to 4,000 mHz. band. While these switches are composed of several diodes and biasing circuits, it is sufficient for our purpose to illustrate them here as functionally simple mechanical switches. Methods of producing a fast switching voltage to drive them, activated from a cam arrangement or equivalent when the moving structure reaches the desired position, are well known in the art.

In FIGS. 5A, B and C we have shown a hybrid junction 43 connecting terminal 16 to coaxial lines 14 and 114 and a switch 44 connecting terminal 22 to coaxial lines 21 and 121. For purposes of this invention, however, either a switch or a hybrid junction may be used in either position; one of each or two of either may be used. The hybrid junction is considerably simpler, requiring no driving voltage, but the switch produces considerably less signal loss. Of course, if two switches are employed, they must be synchronized.

An embodiment which uses two switches and one waveguide is illustrated in FIGS. 6A, and B and C. In this case, two fixed probes 17 and 217 are separated by an attenuator 41 within waveguide 11. A double-pole-double-throw microwave switch 46 connects fixed terminal 16 alternatively to probe 17 or 217 via coaxial line 14 or 214 respectively and the unused probe to ground through characteristic impedance $Z_0$. Of course, two single-pole-double-throw switches, as mentioned above, may be used as a double-pole-double-throw switch. A pair of movable probes 23 and 123 travel in the waveguide slot, preferably approximately 180 degrees apart. Again, for the sake of clarity, counter-clockwise movement is assumed. Another double-pole-double-throw microwave switch 47 couples movable terminal 22 alternatively to either movable probe 23 or 123 via coaxial line 21 or 121, respectively, and the unused probe to ground through the characteristic impedance $Z_0$. The three views of FIG. 6 illustrate the connections at three different times. When the movable probes are approximately 90 degrees away from the fixed antenna attenuator combination, as in FIG. 6A, probe 23, which is moving away from the fixed probes is connected to movable terminal 22; fixed probe 17, nearest to movable probe 23, is connected to fixed terminal 16. Unused probes 123 and 217 are each connected to a characteristic impedance $Z_0$. When the building has rotated about 90 degrees, movable probe 123 is adjacent to attenuator 41, as shown in FIG. 6B. At this point, switch 46 is operated to couple fixed probe 217 to fixed terminal 16 and probe 17 to $Z_0$. This move is desirable to avoid transmitting signals down the waveguide past an unused probe. When the building has rotated about another 90 degrees, as in FIG. 6C, both switches are operated to couple probes 17 and 123 to the terminals. Thus, switch 47 is operated twice per cycle and switch 46 four times per cycle. All unused probes are connected to a termination $Z_0$ equal to the characteristic impedance of the waveguide in order to minimize reflections within the waveguide and hence standing waves and radiation.

In this embodiment it will be noted that the active movable probe is always in the unobstructed half of the waveguide. It is therefore possible to use only a sector of a waveguide, similar to sector 111 of FIG. 5, except a few wavelengths longer than a semicircle, with a fixed probe and an attenuator at each end. This could be a considerable advantage in the saving of waveguide, and where there is a building obstruction. Of course, the movable probes must have clearance to travel in a complete circle.

While a few specific embodiments of the invention have been described above, it will be obvious that many changes and modifications may be made therein without a departure from the spirit and scope of the invention.

What is claimed is:

1. Apparatus for coupling electromagnetic signals of microwave frequencies between two terminals capable of relative motion comprising a waveguide of rectangular cross section having a slot in the substantial center of one face, a first terminal, first coupling means in fixed relation to said waveguide for coupling said signals between said first terminal and said waveguide, a second terminal capable of relative movement parallel to said wave guide, and second coupling means for coupling said signals between said second terminal and said waveguide comprising a coaxial transmission line having an inner and an outer conductor, both connected at one end to said second terminal, said outer conductor being electrically coupled at its other end to the outer surface of said waveguide, said inner conductor entering said waveguide through said slot without making contact therewith.

2. Apparatus as in claim 1 wherein said outer conductor makes electrical contact to said outer waveguide surface by brush means.

3. Apparatus as in claim 1 wherein said outer conductor is coupled to said outer waveguide surface by capacitive means.

4. Apparatus as in claim 1 wherein said outer conductor is coupled to said outer waveguide surface by microwave choke coupling means.

5. Apparatus for coupling electromagnetic signals of microwave frequencies between two terminals capable of relative rotation comprising an annular waveguide of rectangular cross section having a continuous slot in the substantial center of one face, a first terminal, first coupling means in fixed relation to said waveguide for coupling said signals between said first terminal and said waveguide, means within said waveguide for attenuating overlapping transmission from opposite directions, a second terminal capable of rotation relative to said waveguide, and second coupling means for coupling said signals between said second terminal and said waveguide comprising a coaxial transmission line having an inner and an outer conductor both connected at one end to said second terminal, said outer conductor being electrically coupled at its other end to the outer surface of said waveguide, said inner conductor entering said waveguide through said slot without making contact thereto.

6. Apparatus as in claim 5 including at least a sector of a second annular waveguide of rectangular cross section having a slot in the substantial center of one face, third coupling means in fixed relation to said sector for coupling said signals between said first terminal and said sector, fourth coupling means capable of rotation in synchronism with said second terminal, for coupling said signals between said sector and said second terminal, and switching means for alternatively connecting said second and fourth coupling means to said second terminal.

7. Apparatus as in claim 5 including third coupling means for coupling said signals between said first terminal and said waveguide, first switching means for connecting said first terminal alternatively between said first and third coupling means, fourth coupling means for coupling said signals between said second terminal and said waveguide, and second switching means for connecting said second terminal alternatively between said second and fourth coupling means wherein said first switching means operates four times per cycle and said second switching means operates two times per cycle.

8. Apparatus as in claim 7 including means for connecting the unused coupling means to the characteristic impedance of the waveguide.

References Cited

UNITED STATES PATENTS

| | | | |
|---|---|---|---|
| 2,737,633 | 3/1956 | Tomiyasu | 333—98 |
| 3,189,855 | 6/1965 | Fouer | 333—98 |

HERMAN KARL SAALBACH, *Primary Examiner.*

L. ALLAHUT, *Assistant Examiner.*